(No Model.)
G. B. YOUNGS.
SPIRIT LEVEL.
No. 285,775. Patented Sept. 25, 1883.
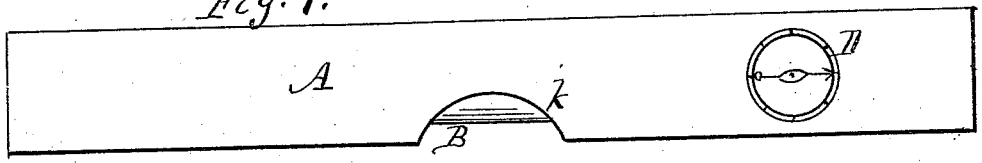
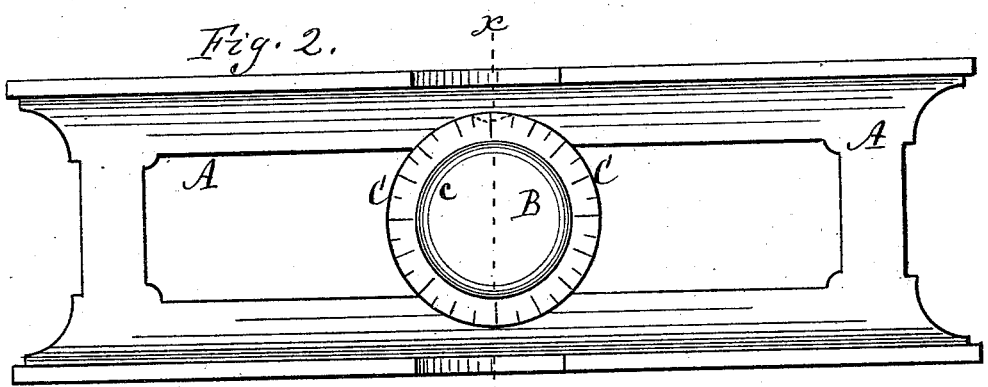
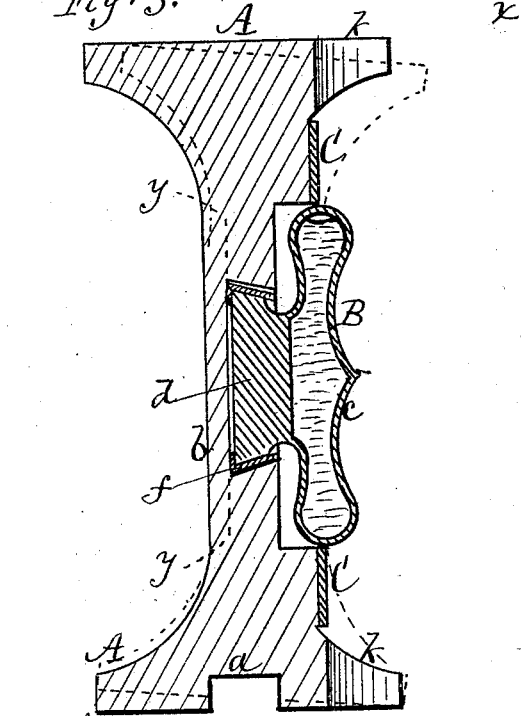
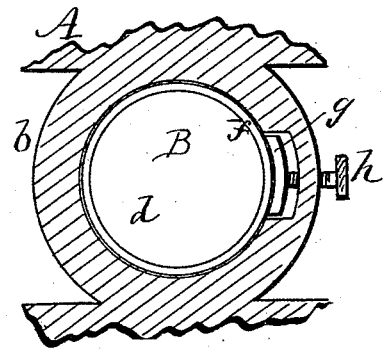
Attest.
R. E. White
P. A. Cartier
Inventor.
Geo. B. Youngs.
pr R. F. Osgood
atty

UNITED STATES PATENT OFFICE.

GEORGE B. YOUNGS, OF ROCHESTER, N. Y., ASSIGNOR OF ONE-HALF TO ALBERT H. NIRDLINGER, OF SAME PLACE.

SPIRIT-LEVEL.

SPECIFICATION forming part of Letters Patent No. 285,775, dated September 25, 1883.

Application filed August 11, 1883. (No model.)

*To all whom it may concern:*

Be it known that I, GEORGE B. YOUNGS, of Rochester, Monroe county, New York, have invented a certain new and useful Improvement in Spirit-Levels; and I do hereby declare that the following is a full, clear, and exact description of the same, reference being had to the accompanying drawings, in which—

Figure 1 is a plan of the device. Fig. 2 is a side elevation. Fig. 3 is a cross-section on an enlarged scale in line $x\,x$ of Fig. 2. Fig. 4 is a section in line $y\,y$ of Fig. 3.

My improvement relates to a spirit-level in which a circular glass bulb is used in place of the ordinary flat tube, said bulb being so formed that as the level is inclined forward or backward at right angles to its length it will still indicate correctly.

The invention consists in the construction and arrangement hereinafter described and claimed.

In the drawings, A shows the body of the level, which is usually made of wood, and may be of any desired length and form, according to the work to which it is applied. It is shown of skeleton form with a flat top and base, the latter provided with a longitudinal groove, $a$, and a center bearing, $b$, is left for the attachment of the glass bulb, as will be presently described.

B is the glass bulb, which contains the spirits or other liquid used in leveling. The face $c$ of the bulb is hollow and in the form of a perfect disk or circle. In cross-section the edges are round, and the rounded part is carried inward or beyond the parallel sides of the face, so that the round forms really more than a half-circle. This is for the purpose of making the bubble show in the rounded edge even when the level is tipped forward or back from a vertical line and at right angles to the length of the level, as indicated by the dotted lines in Fig. 3. In leveling it is sometimes necessary to set the level at an angle, instead of upright, and if the curve of the rounded edge were not carried in beyond the plane of the sides, the bubble would float down into the flat part of the bulb and the indication of level would be lost; but by so carrying in the rounded edge the bubble will always lie in the circular part at whatever angle the level may be set. The bulb is filled with the spirits clear to the top, except the small space for the bubble; hence the level can be set at any angle (longitudinally) from the horizontal to the vertical, and can indicate any angle by using a scale of degrees around the bulb, and can also be used as a plumb. The bulb is provided with a circular base, $d$, of dovetailed form in cross-section, which sets into a corresponding circular socket, $b$, in the center of the level, as shown in Figs. 3 and 4.

$f$ is a rubber lining or packing, surrounding the edge of the base, and $g$ is a movable follower, operated by a set-screw, $h$, for holding the bulb fast at any adjustment. By loosening the set-screw the bulb can be turned, and when properly adjusted the set-screw can be turned up again, fastening the bulb in place. The bulb is tested and adjusted by setting the level on a plane surface, marking the position of the bubble, then shifting ends of the level and marking again, and adjusting the bulb axially till the exact point is attained. When once set it rarely requires change. A half-circular opening, $k$, is made in the top and bottom of the level, so that in looking down the bulb can be readily seen.

C is a circular flat ring, of brass or other suitable metal, surrounding the bulb and resting closely to its outer edges. This ring is attached to the body of the level, and may be made adjustable axially, if desired, by means of set-screws resting in slots of the ring. This ring is marked on its face by a scale of degrees, as indicated in the face view, Fig. 2. The bubble as it floats in the bulb plays opposite the scale, and therefore the level or any angle can be readily ascertained.

If desired, the bulb may be made with a double face, one on each side of the level, and two rings may be used, one with each face.

In the top of the level is set an ordinary magnetic compass, D, which is frequently of much use to workmen and others using the level.

By the use of the circular bulb, as above described, the level can indicate particular angles or inclines, as well as levels. The rounded edge enables it to be used set at an angle transversely, and the groove $a$ in the bottom allows the level to be centered on a shaft or other round surface without trouble.

Having described my invention, what I claim as new, and desire to secure by Letters Patent, is—

1. A spirit-level provided with a circular hollow glass bulb having edges circular in cross-section and carried inward beyond the plane of the sides, for the purpose of retaining the bubble in the round when the level is set at an angle transversely, as set forth.

2. A spirit-level provided with a circular hollow glass bulb with edges circular in cross-section, and provided with a base which sets in a circular groove of the level and is adjustable axially to different positions, as set forth.

3. In a spirit-level, the combination, with the hollow circular glass bulb B, provided with the circular base $d$, resting in a circular groove of the level, of the rubber packing $f$, surrounding the edge of the base, the follower $g$, resting against the packing, and the set-screw $h$, for operating the follower, as herein shown and described.

4. A spirit-level provided with a hollow circular glass bulb having its edges circular in cross-section, and a separate ring surrounding the bulb and marked with a scale of degrees, as and for the purpose specified.

In witness whereof I have hereunto signed my name in the presence of two subscribing witnesses.

G. B. YOUNGS.

Witnesses:
R. F. OSGOOD,
JACOB SPAHN.